Jan. 2, 1945. W. C. HEATH 2,366,528
EXTRUSION CENTERING WIRE GUIDE
Filed March 9, 1942
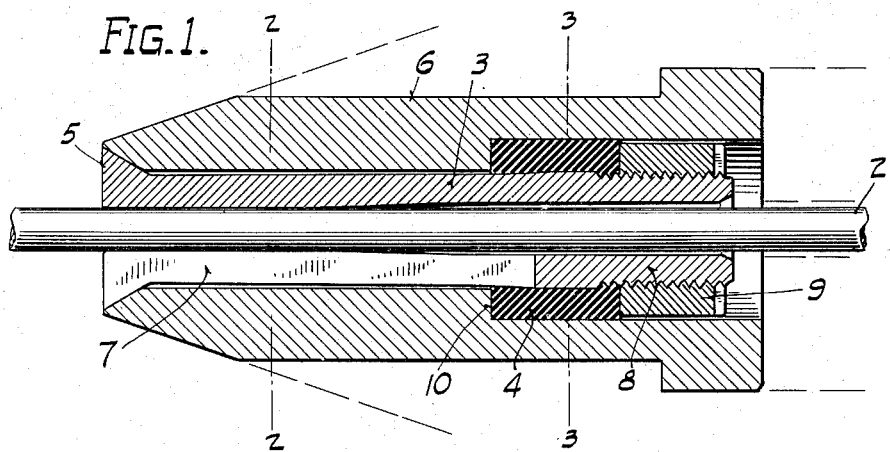
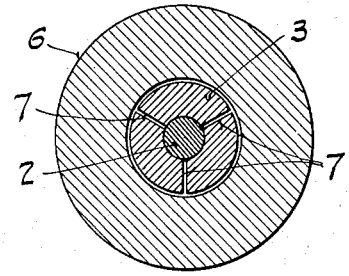
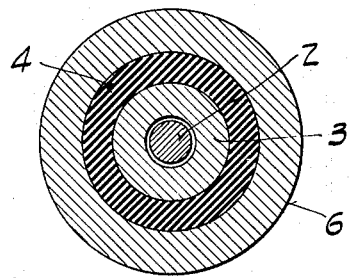
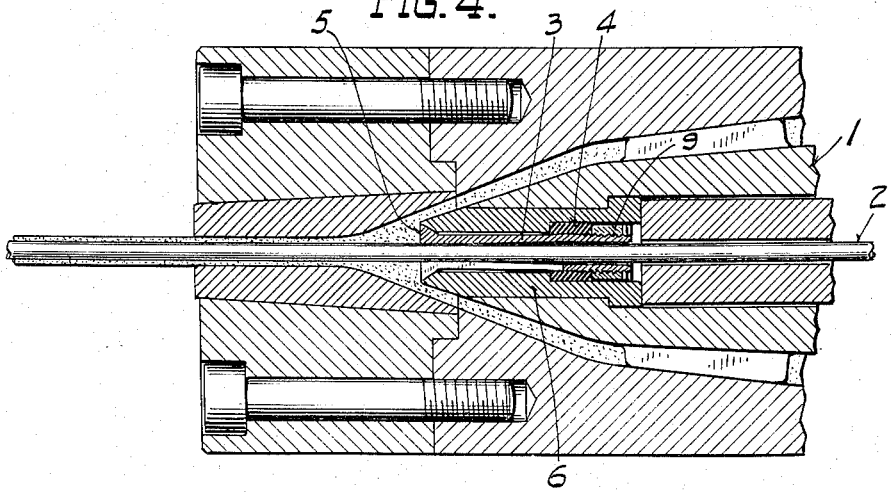
William C. Heath
INVENTOR.
BY *Elwin A. Andrus*
ATTORNEY.

Patented Jan. 2, 1945

2,366,528

UNITED STATES PATENT OFFICE 2,366,528

EXTRUSION CENTERING WIRE GUIDE

William C. Heath, Shorewood, Wis., assignor to A. O. Smith Corporation, Milwaukee, Wis., a corporation of New York Application March 9, 1942, Serial No. 433,970

2 Claims. (Cl. 18—13)

This invention relates to an extrusion centering wire guide and more particularly to a wire guide for employment in an extrusion machine for coating weld rods.

One object of the present invention is to provide a wire guide that will automatically maintain weld rods passing therethrough in axial alignment with the center of the plastic material flowing into the nozzle of the extrusion machine against changes in the pressure of the plastic coating material.

Another object is to provide a wire guide that automatically adjusts itself to carry weld rods that vary in diameter within limits of manufacturing tolerances.

Other objects of this invention will become apparent from the following description of an embodiment of the invention illustrated in the accompanying drawing.

In the drawing:

Figure 1 is a central longitudinal section of a wire guide embodying the invention.

Fig. 2 is a section taken on line 2—2 of Figure 1;

Fig. 3 is a section taken on line 3—3 of Figure 1; and

Fig. 4 is a central longitudinal section of the forward end of an extrusion nozzle showing the location of the wire guide therein.

Referring to the drawing, the wire guide illustrated is longitudinally disposed within a suitable housing 1 of the extrusion nozzle. The wire guide has an axial channel for the passage of the weld rod 2 and comprises a sleeve or collet 3 of a generally tubular shape and a resilient ring member 4 encircling the rear portion of the sleeve 3.

The sleeve 3 is made of wear resistant material, such as Carboloy and has its forward end 5 adjacent the nozzle enlarged and tapered on its outer surface outwardly toward the forward end in a frustro-conical manner complementary to a frustro-conical cavity in the forward end of the cylindrical casing 6 for the wire guide. The remaining portion of the sleeve 3 is substantially cylindrical with its outer surface spaced radially from the inner bore of the casing 6.

The forward end of the sleeve 3 has a plurality of longitudinal slots 7 extending rearwardly to a position adjacent the resilient ring 4 to allow the forward end of the sleeve to contract and expand diametrically under the influence of the varying diameter of the rod 2 and the engaging conical surfaces of the sleeve and housing.

The rear end 8 of the sleeve 3 is not slotted and it has a sufficient internal diameter to readily allow passage of the rod 2 therethrough. The outer surface of the rear end 8 of the sleeve 3 is threaded to receive a nut 9 which bears against the resilient ring 4 and compresses it longitudinally against a shoulder 10 of the casing 6.

The resilient ring 4 may be formed of rubber of the desired resiliency and compressibility or it may be constituted of a coil spring or other suitable cushion member to bias the sleeve 3 rearwardly so that the conical surfaces of the sleeve and housing urge the forward ends of the segments of the sleeve radially inward against the rod 2. The amount of centering pressure exerted by the segments of the sleeve 3 against the rod 2 will depend upon the amount of compression of ring member 4 by the nut 9.

The slope of the conical surfaces of the sleeve 3 and casing 6 should be such as to provide for the expansion of the sleeve segments radially when the rod varies to a larger diameter within normal tolerances, without resistance from the added longitudinal compression of member 4. A more gradual slope may cause too great a resistance to the necessary radial movement of the segments, while a more abrupt slope may result in too little centering pressure on the rod.

The tapered surface of the casing 6 engaging the frustro-conical shaped forward end 5 of the sleeve 3 provides a radial pressure that combines with the longitudinal pressure of the resilient ring member 4 to pre-load the wire guide and thereby axially align the weld rod 2 passing through the wire guide with the center of the plastic material flowing against the weld rod in the extrusion nozzle. Any substantial deflection of the rod by normal variations of the pressure of the plastic material is prevented as the rod passing through the wire guide cannot be moved from a concentric position with respect to the casing 6.

The wire guide illustrated is particularly effective in carrying weld rods that vary in diameter within normal manufacturing tolerance limits. The wire guide may be made in different sizes to handle various diameters of weld rods but each wire guide is adjustable to carry weld rods of the same nominal diameter but whose diameter varies within certain manufacturing tolerance limits.

The pre-loading of the wire guide shown, by threading the annular nut 9 onto the sleeve 3 and against the ring member 4 to compress the latter and by the providing of the frustro-conical shaped slotted surface in the forward end of the sleeve 3 to engage the tapered casing 6, causes the wire guide to automatically adjust itself to handle weld rods of different diameters within the tolerance limits for a given diameter rod.

In manufacturing the wire guide illustrated the continuous ring portion comprising the rear part of the tubular sleeve 3 is constructed to carry weld rods of maximum tolerances of a given diameter.

In assembling the wire guide the sleeve 3 is first inserted into the forward end of casing 6, then ring member 4 is slipped over the rear end of the sleeve until it engages the shoulder 10 of the casing. The nut 9 is then threaded onto the sleeve and tightened to provide the desired centering pressure for the wire guide.

In operation, the entrance of a weld rod into the sleeve from the rear causes the segments of the sleeve which engage the rod to be urged forwardly and radially outwardly. This forward urging of the sleeve from the rod, together with the forward biasing of the sleeve from the radial expansion of the segments against the tapered surface of the casing 6 is opposed by the resulting added compression of the ring member 4. The greater the diameter of the rod within the tolerances allowed, the greater the compression of the member 4. The pre-compression of the ring member 4 should be sufficient to bias the sleeve longitudinally the desired amount rearwardly against the tapered surface of the casing 6 to retain the centering of the rod 2 at all times.

The wire guide illustrated and described effectively handles weld rods of different sizes within given limits and maintains them in axial alignment with the extrusion nozzle so that a uniform plastic coating will be obtained on the rod.

Various embodiments of the invention may be made within the scope of the claims.

The invention is hereby claimed as follows:

1. An extrusion nozzle wire guide for axially aligning a longitudinally moving rod with the center of an extrusion nozzle for coating the same, comprising a wear resistant cylindrical sleeve through which the rod passes said sleeve being unslotted at the rear end and having a plurality of slots at the forward nozzle end to provide segments capable of radial movement to grip the rod and compensate for tolerances in diameter thereof, means responsive to the relative longitudinal position of the sleeve to exert a radial pressure upon said segments tending to effect gripping and centering of the rod, and compressible means disposed in a radial space between said first named means and the unslotted portion of the sleeve to bias the same longitudinally in a direction tending to effect operation of said first named means.

2. In an extrusion nozzle wire guide having a nozzle and an inner casing aligned therewith, a tubular wear resistant sleeve disposed within said casing to engage a rod moving axially through said sleeve and concentrically align said rod with the nozzle, a plurality of slots provided solely in the forward end of the sleeve to provide radially movable segments, means on said casing engaging said segments to move the sleeve longitudinally forwardly when said segments are moved radially outward, and means to bias the sleeve longitudinally rearwardly to effect a radially inward pressure on said segments and apply a centering clamping pressure on said rod.

WILLIAM C. HEATH.